No. 753,279. PATENTED MAR. 1, 1904.
A. E. LIPP.
MULTIPLE VIEW BACK FOR CAMERAS.
APPLICATION FILED SEPT. 6, 1902.
NO MODEL.
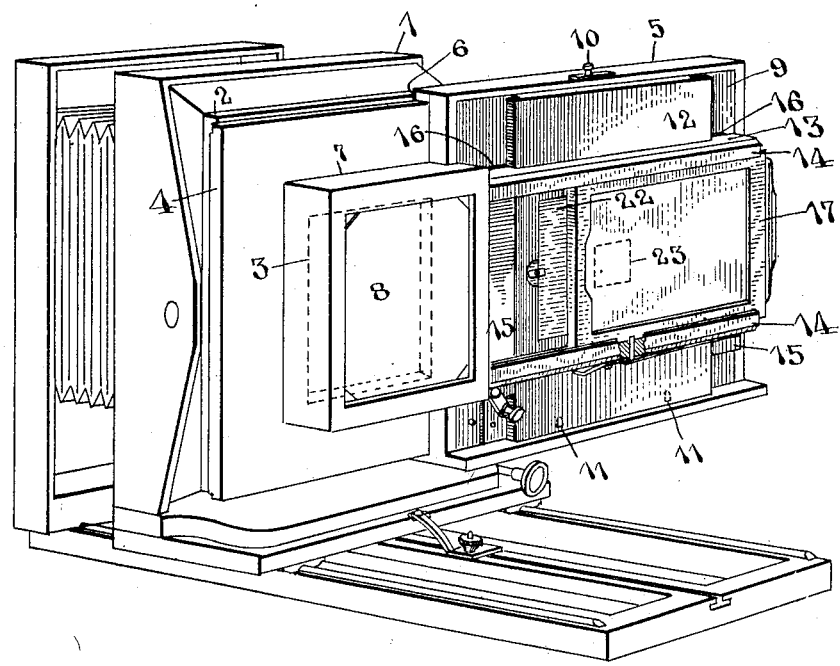
Fig 1.
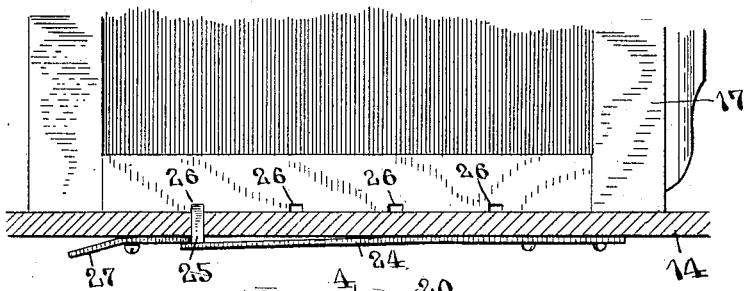
Fig 2.
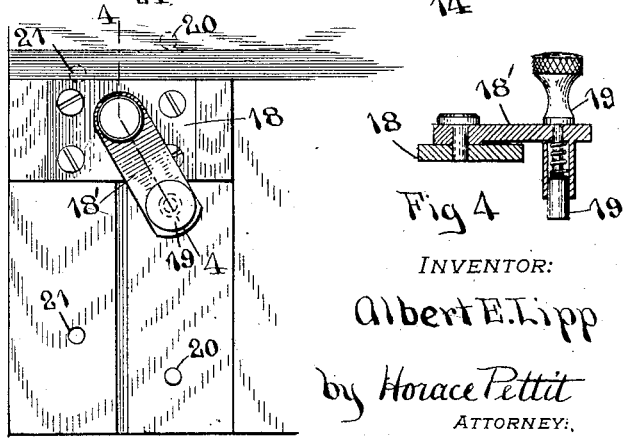
Fig 3.
Fig 4.
WITNESSES:
Edw. W. Vaill Jr.
J. Henderson.
INVENTOR:
Albert E. Lipp
by Horace Pettit
ATTORNEY:
THE NORRIS PETERS CO., PHOTO-LITHO., WASHINGTON, D. C.

No. 753,279. Patented March 1, 1904.

UNITED STATES PATENT OFFICE.

ALBERT E. LIPP, OF HADDONFIELD, NEW JERSEY.

MULTIPLE-VIEW BACK FOR CAMERAS.

SPECIFICATION forming part of Letters Patent No. 753,279, dated March 1, 1904.

Application filed September 6, 1902. Serial No. 122,297. (No model.)

*To all whom it may concern:*

Be it known that I, ALBERT E. LIPP, a citizen of the United States, and a resident of Haddonfield, State of New Jersey, have invented certain new and useful Improvements in Multiple-View Backs for Cameras, of which the following is a full, clear, and exact disclosure.

In general my invention relates to photographic cameras, and has for its object to produce an attachment or back for portrait or other cameras whereby a plurality of views or negatives may be made upon a single plate, the construction employed in attaining this object being much more simple, accurate, and efficient in operation than anything heretofore produced for the purpose.

Broadly, my invention consists of a board or plate which is adapted to fit the sliding frame or back usually employed with portrait-cameras, which board or plate carries a transversely-slidable frame adapted to carry a plate-holder of the construction usually employed with landscape-cameras.

For a full, clear, and exact description of my invention reference may be had to the following specification and to the accompanying drawings, forming a part thereof, in which—

Figure 1 shows a perspective view of a portrait-camera having my improved back or attachment in place thereon. Fig. 2 is an elevation of a plate-holder, showing one of the guides in section and indicating the means for holding the plate-holder in position longitudinally of the guides. Fig. 3 is a plan view of the spring-pin carried by the transversely-slidable frame for fixing said frame in different positions. Fig. 4 is a sectional view of said spring-pin, taken substantially upon the lines 4 4, Fig. 3.

The numeral 1 indicates a camera of the usual construction employed by photographers for portrait work. Upon the rear frame of this camera is attached a board or plate 2, having an opening 3 therein opposite the lens carried at the front of the camera. The board or plate 2 carries a second board or plate 4, which is extended in one direction beyond the plate 2 to form a prolonged guide for the frame 5, which slides longitudinally thereof. The edges of the plate or board 4 form guideways for the frame 5, said frame being retained upon said guideways by thin plates 6, attached thereto. The plate 4 also has an opening corresponding with the opening 3 in the plate 2. The frame 5 has attached to one vertical end thereof a frame or box 7, which carries the ground glass or screen 8 for focusing the camera before a view is taken. This ground glass 8 is raised a sufficient distance from the plate or board 4 to compensate for the height of the plate-holder from said plate or board 4. The parts thus far described are similar to those which are in general use in photographic cameras of this class, and my invention does not include the same.

The following-described parts are those which constitute my invention: The frame 5, above described, is made square, and I have adapted to be fitted therein a square board or back 9, which is retained in position in the usual manner by a pin 10 at the top and dowels 11 at the bottom. Corresponding recesses are made upon both the vertical and horizontal edges of the board or back 9, so that the same may be inserted in the frame 5 in either of two positions. This board or back 9 has an opening therein which is adapted to receive screens or kits 22, each of which has an opening 23 of a size depending upon the fraction of the area of the plate which it is desired to expose at one time. Upon this board or back 9 I have formed a raised portion 12, constituting guides for retaining in position a transversely-slidable frame 13. This frame consists of the two parallel grooved or recessed guides 14 14, connected at their ends by transverse strips 15. This frame 13 is retained in position by plates 16, which fit beneath the edges of the guides 12. An ordinary landscape or view plate holder, such as used with cameras of smaller size, is inserted so as to slide longitudinally in the guides 12. Upon the end of one or both of the strips 15 is attached a plate 18, carrying a swinging or pivoted arm 18, which carries at its outer free end a spring-pressed pin 19. The end of this pin 19 is adapted to engage recesses 20 and 21, which are so related to each other as to divide the plate carried by the plate-holder 17 into a plurality of vertical divisions or spaces.

As examples, the recesses 20 are such a distance apart that when the pin 19 engages them successively the plate carried by the plate-holder 17 will be divided into three transverse divisions, while if the pin engages the recesses 21 in succession the plate will be divided into two transverse divisions. The screen 22, which fits the opening in the board or back 9, has an opening 23 therein, which corresponds in width to the space between the holes 20, which may be any fraction of the width of the plate in the plate-holder 17. A groove 24 is provided in the board 9 at the lower corner or corners thereof for allowing the pin 19 to slide independently of the recesses should a swinging arm and pin be used at opposite ends of the frame to give additional series of holes and a correspondingly-increased number of divisions of the plate upon which the photographs are to be taken. To retain the plate-holder in position upon the guides 14, a leaf-spring 24 is provided carrying at its outer end at right angles thereto a pin 25. This pin is adapted to project through an opening in the lower guide 14 and engage notches 26, formed in the lower edge of the plate-holder. A slightly-bent lever 27 is attached to the lower side of the guide 14, one end resting under the spring 24, whereby the pin 25 may be withdrawn from the notch or notches 26. The notches 26 and the recesss 20 are so arranged in relation to the plate-holder 17 that the plate carried thereby will be exposed only in a certain number of areas or divisions by the openings 23 when the pins 25 and 19 engage each of their respective notches and recesses succesively.

The operation of my device is as follows: The camera is focused in the usual manner, with the ground glass opposite the opening 3 in the back of the boards 2 and 4. A screen of the requisite size is then inserted in the opening in the plate 9, and the plate-holder carrying the unexposed plate or plates is inserted into the guides 14, so that the pin 25 engages the first notch 26, as shown in Fig. 2. The pin 19 is then made to engage the lowest recess 20, whereby the frame 13 is made to assume such a position that the opening 23 will be brought opposite the upper left-hand corner of the unexposed plate. The lens of the camera is then covered, and the frame 5, together with the box 7, is slid toward the left, so that the opening 23 comes opposite the center of the opening 3. The slide of the plate-holder is then withdrawn and exposure made in the usual way, after which the slide is then replaced. After adjusting the plate-holder 17, so that the pin 25 enters the next succeeding notch 26, the plate within the plate-holder is ready for the next exposure. This may be repeated until one row of exposures has been made. Then the pin 19 is made to engage the next succeeding notch 20 to allow of another row of exposures, and this procedure is continued until the plate is completely covered by a series of exposures—in this instance shown as twelve.

It will be seen that by providing a number of plate-holders 17 having notches dividing its length into different multiples and by providing the back 9 with corresponding series of recesses 20 and 21 and providing screens with openings of a length and width corresponding to each of said series of notches and recesses that the negatives made upon the plate within the plate-holder may be made to vary in size and number almost without limit and with very little change or manipulation of the apparatus for taking the photographs.

Minor changes may be made without departing from the spirit of my invention; but,

Having thus described my invention, what I claim, and desire to protect by Letters Patent of the United States, is—

1. In a photographic camera, the combination with a slidable frame and focusing-screen, of an adjustable back, and a plate-holder slidable vertically and horizontally upon said back and means for fixing said plate-holder in position vertically and horizontally whereby a plurality of negatives may be made upon a single plate, substantially as described.

2. In a photographic camera, the combination with a slidable frame and focusing-screen, of an adjustable back, a rectangular plate-holder frame slidable thereon, a plate-holder slidable in said frame, means for holding the plate-holder frame in different positions on the adjustable back and means for fixing the plate-holder in different positions in the frame whereby a plurality of negatives may be made upon a single plate, substantially as described.

3. In a photographic camera, the combination with a slidable frame and focusing-screen, of a square adjustable back adapted to be inserted in the frame in either of two positions, a transversely-slidable frame carried by said back, a plate-holder slidable in said last-named frame, means for holding said frame in different positions on the adjustable back and means for holding the plate-holder in different positions in the frame whereby a plurality of negatives may be taken upon a single plate, substantially as described.

4. In a photographic camera, the combination of a slidable frame and focusing-screen, an adjustable back, a rectangular frame slidable thereon, a plate-holder slidable in said frame having notches in an edge thereof corresponding in number to definite fractions of the length of the plate-holder, a spring-pressed pin carried by said frame and adapted to engage said notches, an adjustable spring-pressed pin adapted to engage recesses in the adjustable back for fixing the position of said frame corresponding to transverse divisions of the plate-holder whereby a plurality of negatives may be made upon a single plate, substantially as described.

5. In a multiple-view back for cameras, a plate-holder mounted to slide thereon having a series of recesses corresponding to definite divisions or fractions of one dimension of said plate-holder and means carried by the back for engaging said recesses to allow of a series of exposures to be made upon any one of the divisions of a photographic plate carried by said plate-holder, substantially as described.

6. In a multiple-view back for cameras, a plate-holder mounted to slide thereon and having a series of recesses corresponding to definite divisions or fractions of one dimension of said plate-holder, a pin adapted to engage said recesses, a plate-spring for forcing said pin into said recesses and a lever for withdrawing said pin, substantially as described.

7. In a multiple-view back for cameras, a transversely-slidable plate-holder frame mounted thereon, an arm pivoted to said frame, a spring-pressed pin carried by said arm, there being a series of recesses in the back adapted to be engaged by said spring-pressed pin whereby said frame may be held in different positions, substantially as described.

8. In a multiple-view back for cameras, a slidable plate-holder frame, a plate carried by said frame, an arm pivoted to said plate, a spring-pressed pin carried by said arm, there being a series of recesses in the back adapted to be engaged by said spring-pressed pin whereby the frame may be held in different positions, substantially as described.

9. A multiple-view back for cameras comprising a square plate or board, a transversely-slidable plate-holder frame carried thereby, means for holding said plate-holder frame in different positions transversely, a plate-holder slidable transversely on said frame and means for holding the plate-holder in different positions upon said frame, substantially as described.

10. A multiple-view back for cameras, comprising a plate or board having an opening therein, a removable kit or screen for said opening, a transversely-slidable plate-holder frame carried by said back, means for holding said plate-holder frame in different positions transversely, a plate-holder slidable transversely upon said frame and means for holding said plate-holder in different positions upon said plate-holder frame, substantially as described.

11. In a photographic camera, the combination with a member movable with relation to the exposure-opening, of a plate-holder mounted upon said member and movable thereon in independent intersecting paths.

12. In a photographic camera, the combination with a member movable with relation to the exposure-opening, of a plate-holder mounted upon said member and slidable thereon in independent intersecting paths.

13. In a photographic camera, the combination with a member movable with relation to the exposure-opening, of a plate-holder frame slidable upon said member, and a plate-holder slidable upon said frame in a path at an angle to the path of said frame.

14. In a photographic camera, the combination with a member movable with relation to the exposure-opening, of a plate-holder mounted upon said member and movable thereon in independent intersecting paths, and means for fixing said plate-holder in different positions in said paths.

15. In a photographic camera, the combination with a member movable with relation to the exposure-opening, and a removable back carried by said member and having an opening, of a plate-holder upon said back and movable thereon in independent intersecting paths.

16. In a photographic camera, the combination with a member movable with relation to the exposure-opening, and an adjustable back mounted upon said member and having an opening, of a plate-holder mounted upon said back and movable thereon in independent intersecting paths.

17. In a photographic camera, the combination with a member movable with relation to the exposure-opening, and a back mounted upon said member and having an opening, of a plate-holder frame slidable upon said back, and a plate-holder slidable upon said frame at an angle to the path thereof.

In witness whereof I have hereunto set my hand this 2d day of September, A. D. 1902.

ALBERT E. LIPP.

Witnesses:
FREDK. C. EBERHARDT,
CHAS. K. BENNETT.